April 26, 1949.  J. T. LANCASTER  2,468,212
FASTENER TRANSFERRING MECHANISM
Filed Sept. 15, 1945   9 Sheets-Sheet 1

Fig.1.

Inventor
John T. Lancaster
By his Attorney

April 26, 1949.  J. T. LANCASTER  2,468,212
FASTENER TRANSFERRING MECHANISM
Filed Sept. 15, 1945  9 Sheets-Sheet 5

Inventor:
John T. Lancaster
By his Attorney

April 26, 1949.  J. T. LANCASTER  2,468,212
FASTENER TRANSFERRING MECHANISM
Filed Sept. 15, 1945  9 Sheets-Sheet 6

Inventor
John T. Lancaster
By his Attorney

Patented Apr. 26, 1949

2,468,212

UNITED STATES PATENT OFFICE 2,468,212

FASTENER TRANSFERRING MECHANISM

John T. Lancaster, Newton, Mass., assignor to United Shoe Machinery Corporation, Flemington, N. J., a corporation of New Jersey Application September 15, 1945, Serial No. 616,503

18 Claims. (Cl. 1—32)

My invention relates to machines by which fastenings, such as nails, are inserted in work of various kinds, it being particularly applicable to the attachment of heels to shoes.

The invention has as an object the arrangement of one or more fastening-receiving members, as tubular terminals or nipples through which fastenings are directed, in any one of a plurality of positions or designs in accordance with which the fastenings are to be inserted. This object I attain by mounting with the receiving member or members upon their support, a plurality of controlling members for each receiving member, together with means arranged to move each controlling member for the receiving member independently of the associated controlling members. With this independent plural control, there may be applied to the member or members component forces which will give a resultant carrying them to any desired points within the range of adjustment. Preferably, the controlling members consist of slides movable in a supporting casing and having intersecting slots through which the receiving members extend, these slides being movable to cause the positioning of the members by cams which are shown as respectively individual to the slides and rotatable in the casing. I prefer to assemble the cams in a bank, rotatable as a unit, and to include in the bank a gear or other means by which it may be turned, such means including indicating means graduated in accordance with the positions which the receiving members are to assume, as in nailing designs for the attachment of heels. Thus, by simple manipulation on the part of the operator and with little thought, a plurality of tubes may be carried simultaneously to their correct positions controlled by the contour of the cams.

In a fastening-inserting machine, the fastenings received by and delivered through mechanism of the character of that just outlined are to be transferred to the inserting mechanism, and these fastenings must be received, held during transfer, delivered to the inserting mechanism, and, in the present instance, inverted during transfer. The illustrated machine also includes novel transferring mechanism for effecting these controls over the fastenings, as well as to cause the fastenings to be delivered from the mechanism which supplies them only after the transferring mechanism has made its delivery of fastenings to the inserting mechanism and after the fastenings have been driven from the inserting mechanism. This transferring mechanism is fully disclosed and claimed in a divisional application Serial No. 669,128, filed in my name in the U. S. Patent Office on May 11, 1946, for improvements in Fastening-inserting machines.

In the accompanying drawings illustrating one of the many possible embodiments of the invention.

Figure 1:
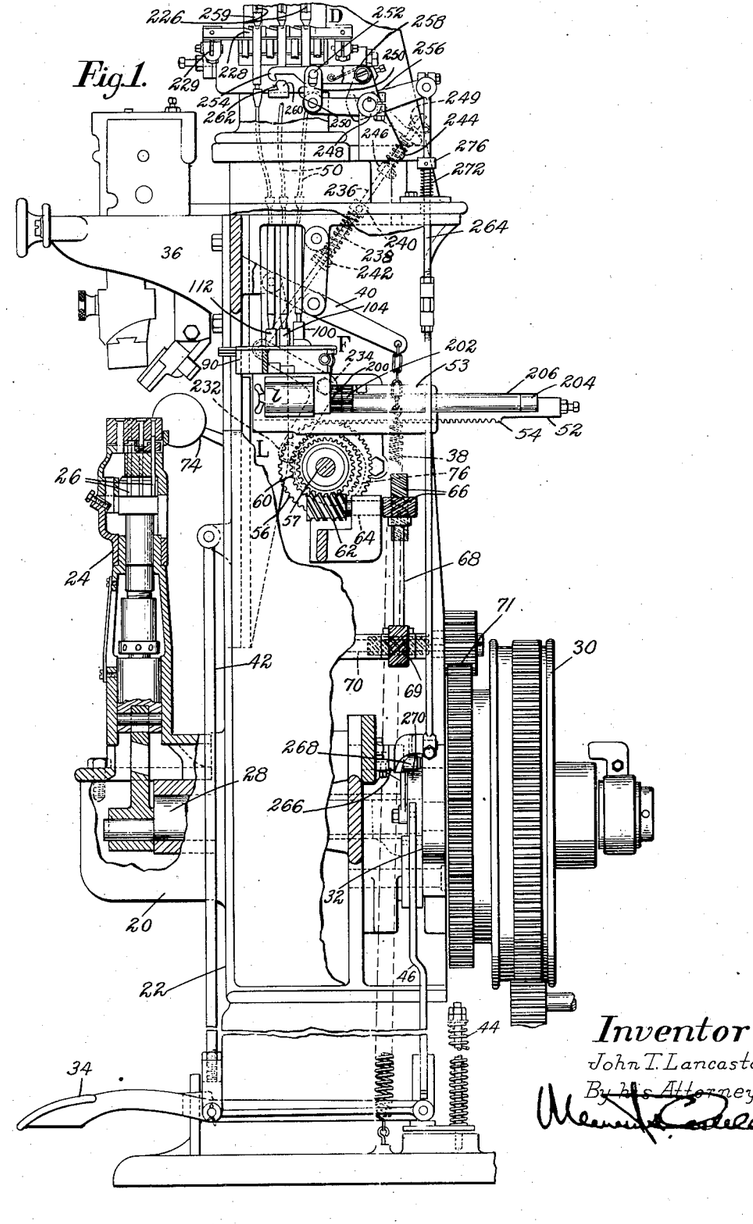
Fig. 1 shows my improved fastening-inserting machine in side elevation, with parts broken away and omitted.

The general structure of the present apparatus may be that of the heel-attaching machine disclosed in Letters Patent of the United States No. 1,867,560, Benjamin, July 19, 1932. As appears in Figs. 1 and 2 of the drawings, a bracket 20 projecting from the front of a frame-column 22 has mounted upon it a shoe-supporting jack 24, in vertical passages in which nail-inserting drivers 26 are movable. These drivers are reciprocated to insert in the work nails which they carry upon their upper extremities, by connection to a horizontal driving shaft 28 journaled in the lower portion of the column. Power is supplied to the shaft 28 through a motor-driven flywheel 30 and a single-rotation clutch mechanism 32 controlled through a treadle 34. To hold a heel upon the heel-seat of a jacked shoe for the insertion of the attaching nails, a pressure-head 36 is mounted to slide in vertical ways at the front of the column. This head is held normally raised by a tension-spring 38, acting upon a lever 40 fulcrumed within the upper portion of the column and pivotally connected to the head. The head is lowered to apply pressure to the work by a link 42 joined to the treadle between its forward and rear extremities. After contact of the head with the heel has been established and sufficient pressure has been applied by the operator to overcome the force of a spring 44 acting to hold the rear end of the treadle yieldably depressed, this end rises and, through a rod 46, trips the clutch 32 to produce a single rotation of the shaft 28 with a resulting nail-inserting reciprocation of the drivers 26.

The heel-attaching nails are supplied from a distributor D (Figs. 1 and 19), which may be similar to that made the subject of Letters Patent of the United States No. 1,947,770, MacKenzie, February 20, 1934, modified in some particulars to better enter into the present invention. It will later be described in greater detail. The nails are delivered in successive loads from the distributor through flexible tubes 50 and foot-plate mechanism F, peculiar to this invention, to novel loading mechanism L, by which they are transferred to the jack 24. As in the previously mentioned Benjamin patent, the mechanism L has a slide 52 guided for horizontal reciprocation in a bracket 53 projecting from the column 22, the slide carrying at its forward extremity a nail-transferring or loading device l. The movement of the device, to carry it from the nail-receiving position beneath the foot-plate F to its delivering position above the jack 24, may be produced by a a rack 54 upon the slide, and a gear 56 meshing therewith and turned by a shaft 57 which it surrounds through a friction device 58 (Fig. 4). A clutch 59 may connect the shaft successively to first one and then the other of two bevel-gears 60, 60, which are constantly rotated in opposite directions. One of these gears receives its motion through worm-gearing 62, a horizontal shaft 64, worm-gearing 66, a vertical shaft 68, worm-gearing 69, a horizontal shaft 70 and spur-gearing 71, including an element carried by the flywheel 30. The rotation of the gear 60, thus produced, is transmitted to the companion gear through an intermediate bevel-pinion 72. The clutch 59 is engaged to cause the nail-delivering movement of the loading device through a hand-lever 74 actuated by the operator, and is shifted under the control of a cam 76 on the shaft 57 to effect reverse movement of the loading device. At the end of the travel in both directions the friction device 58 slips.

Figures 3, 19:
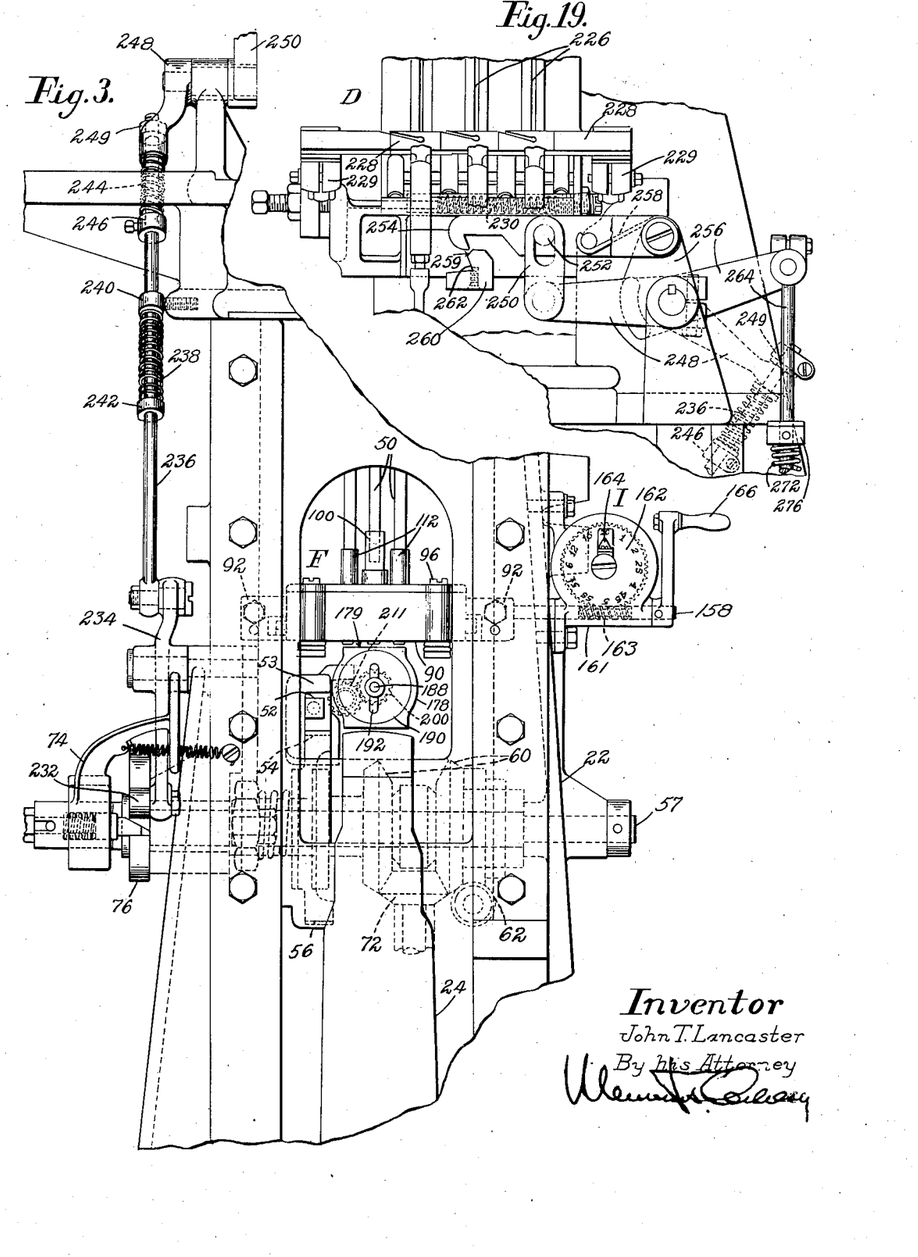
Fig. 3, an enlarged front elevation of the elements more closely associated with the work.
Fig. 19, an enlarged front elevation of the lower portion of the fastening-distributor.
Figure 4:
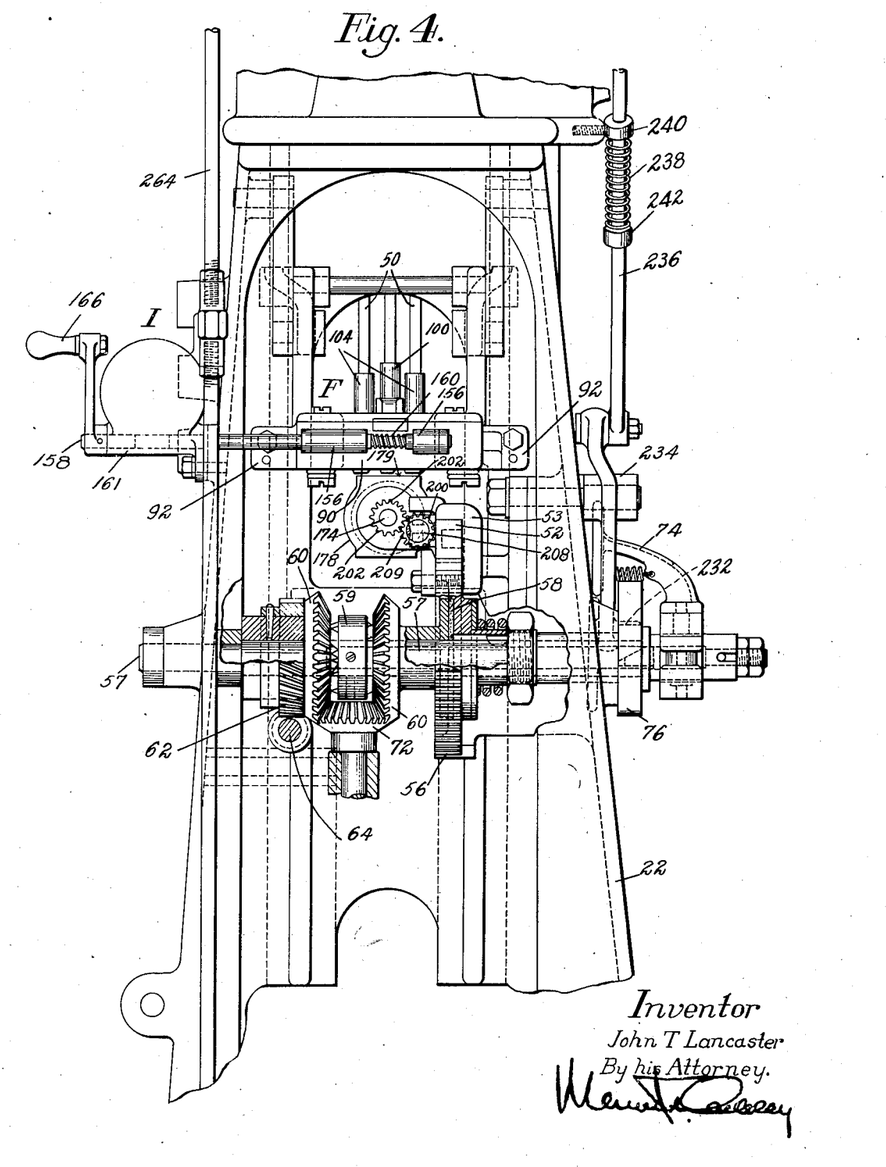
Fig. 4, a corresponding rear elevation.
Figure 5:
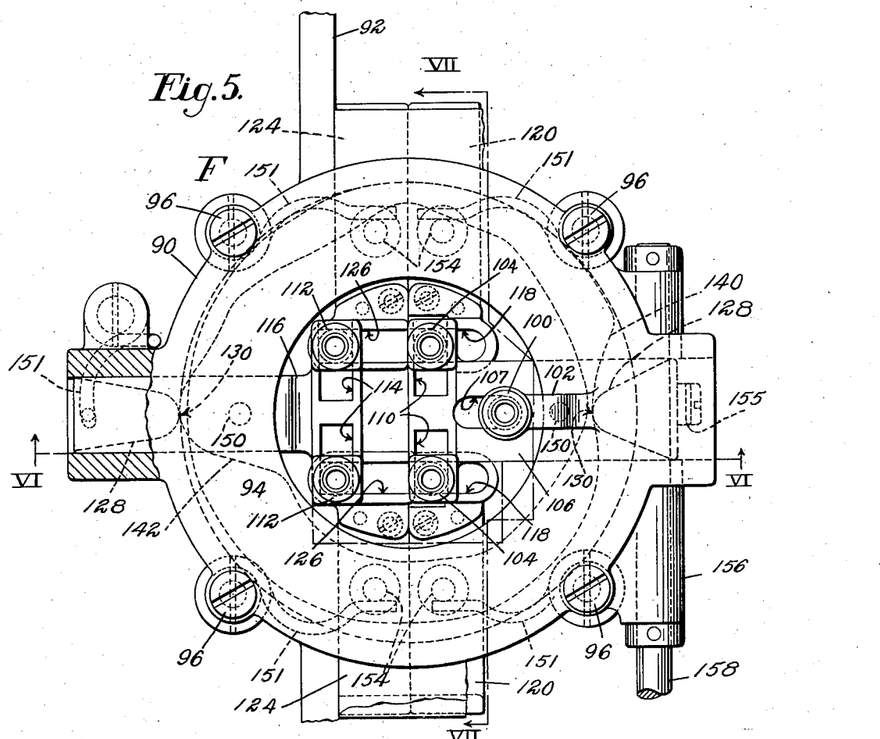
Fig. 5, a top plan view of the foot-plate mechanism, the fastening-receiving nipples being set for the largest inserting design.

Considering now the foot-plate mechanism F of this invention and referring particularly to Figs. 3 and 5 to 11 of the drawings, its special purpose is to provide terminals for the tubes 50 receiving nails from the distributor D, which terminals may be arranged quickly and by simple manipulation for all simultaneously, to give any one of an entire set of designs in accordance with which the nails are to be inserted. The support for the mechanism of the foot-plate is constituted by an annular casing 90 attached by opposite lugs 92, 92 to the interior of the column 22 at the rear of an opening in the front wall (Fig. 3). For the casing a cover-plate 94 is provided, this being held in place by screws 96. In the opening at the center of the annulus are mounted five short tubes or nipples to receive the lower ends of the five distributor-tubes 50. Of these nipples, that designated as 100 is carried by a bracket 102 extending from the upper face of the cover 94 over the casing-opening. The nipple 100 is thus fixed in position, it corresponding to the rear nail of all inserting designs, the position of which is unvarying. Nipples 104, 104, which are to deliver the pair of nails succeeding the rear nail toward the breast of the heel to be attached, are supported upon a slide 106 guided in the casing. A slot 107 in the slide receives the nipple 100 to avoid interference with the travel of the slide. The nipples 104 are movable in a pair of slots 110, 110 in the slide 106, these slots extending oppositely from each side of the center of the slide laterally of the machine, and are shouldered at 109 to rest on the upper surface of the slide. Collars 111 secured to the lower portions of the nipples prevent their upward displacement. Nipples 112, 112 for the breast-nails are movable along slots 114, 114 in a slide 116, situated opposite the slide 106 and guided similarly thereto. The lower portion of each of the nipples 104 is received in a slot 118, extending transversely of the corresponding slot 110, and formed in each of two opposite slides 120, 120 guided in the casing in paths at right-angles to the slides 106 and 116. Movable beside each of the slides 120 is a slide 124, having a slot 126 located similarly to the slot 118 and receiving the nipples 112 for the breast-nails. Each of the six slides has a portion 128 extending inwardly parallel to the body of the slide and provided at its inner end with a contact-surface 130.

Figure 6:
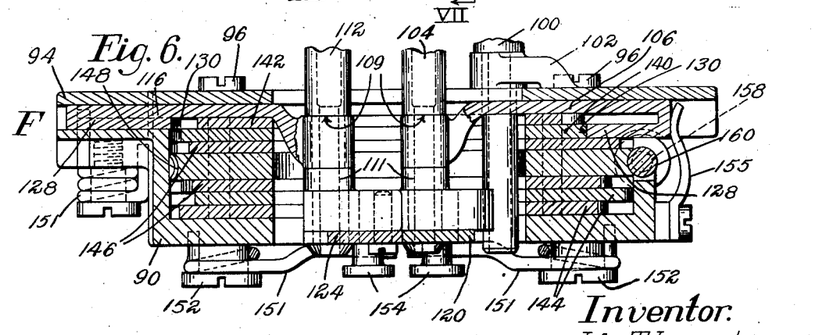
Fig. 6, a vertical section on the line VI—VI of Fig. 5.
Figure 7:
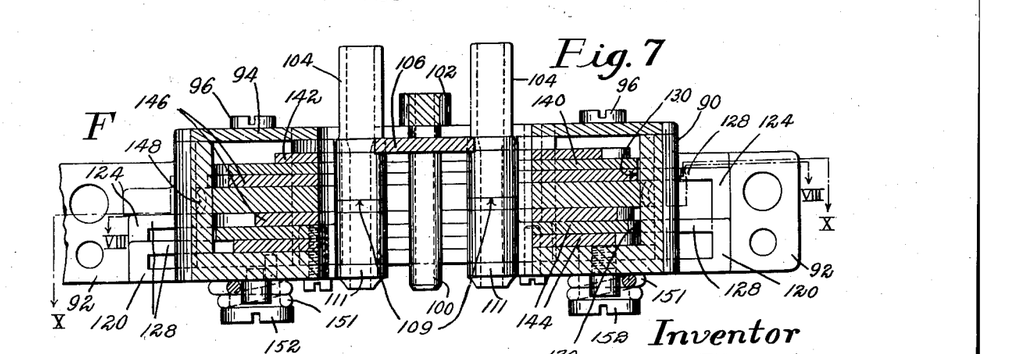
Fig. 7, a vertical section on the line VII—VII of Fig. 5.
Figure 8:
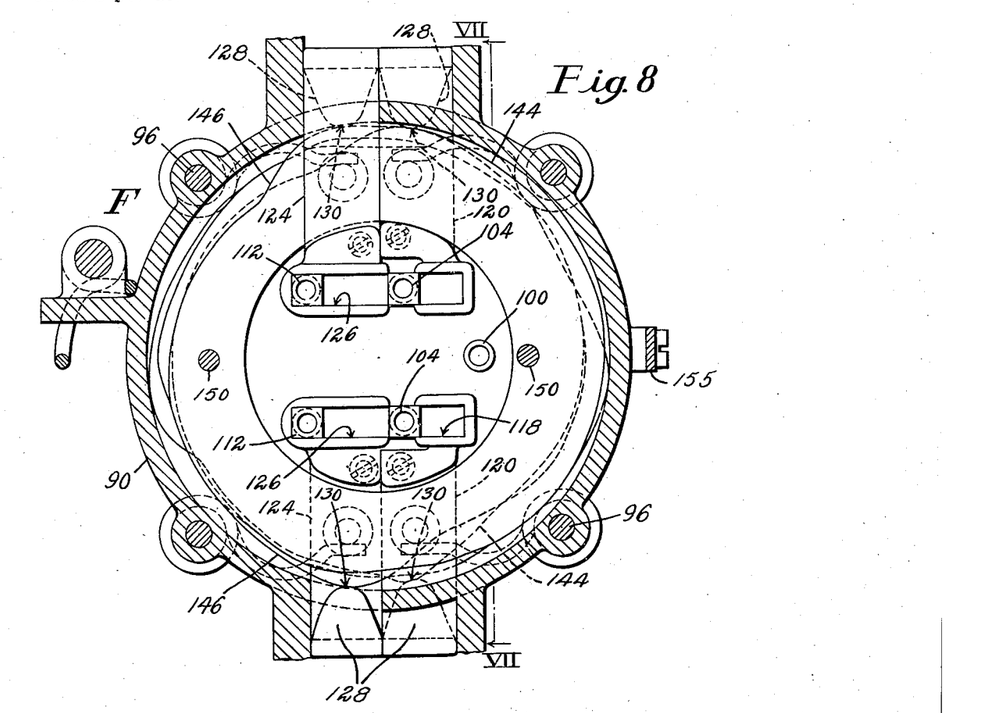
Fig. 8, a full horizontal section on the line VIII—VIII of Fig. 7.
Figure 9:
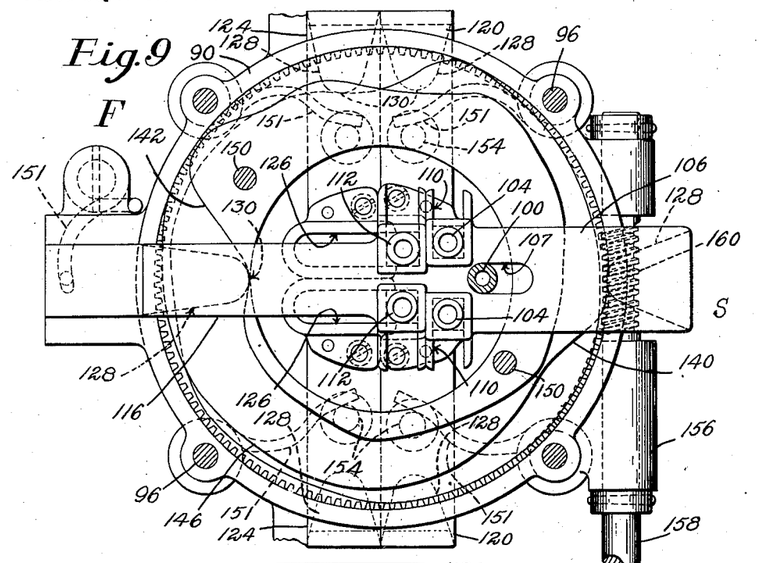
Fig. 9, a top plan view of the foot-plate mechanism with the cover removed, the fastening-receiving nipples being set for the smallest inserting design.
Figure 10:
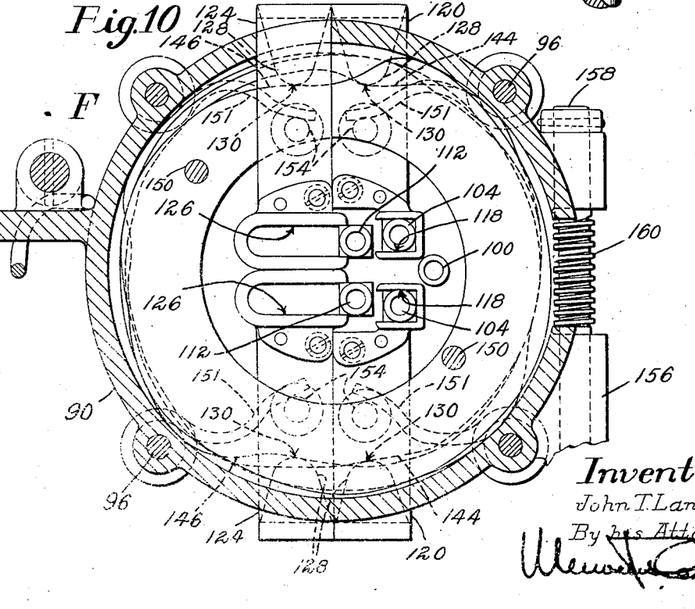
Fig. 10, a full horizontal section in the plane indicated by the line X—X of Fig. 7 but with the nipples set as in Fig. 9.
Figures 11, 13:
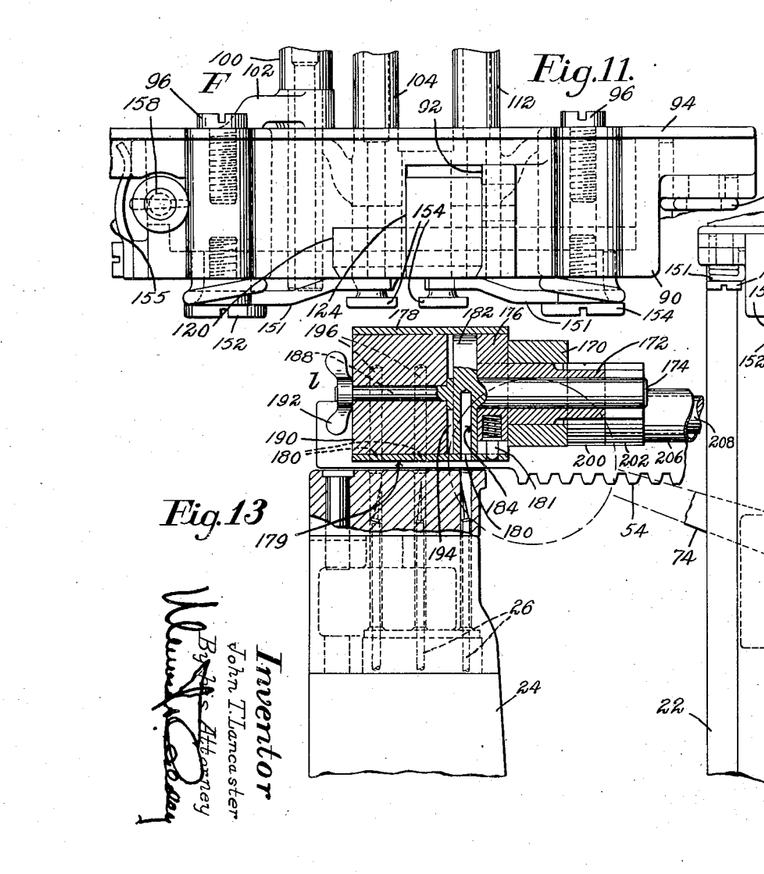
Fig. 11, a side elevation of the foot-plate mechanism as viewed from the left of the machine.
Fig. 13, a similar view of the jack and loading device, the latter being in fastening-delivering position.
Figure 12:
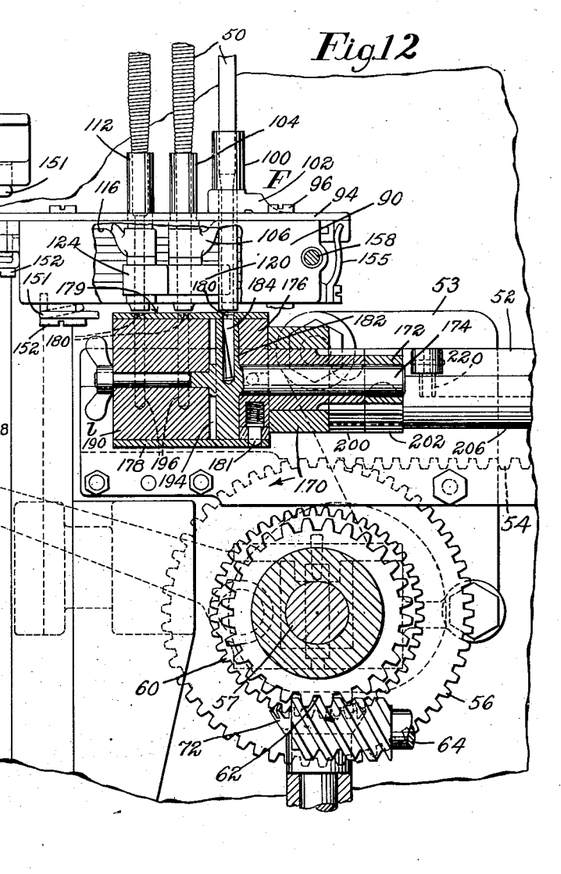
Fig. 12, a broken side elevation of the foot-plate mechanism and a portion of the loading mechanism, as seen from the right, the loading device being in fastening-receiving position.

It will be seen that acting upon each of the movable nipples for the tubes 50 are two slots, disposed transversely to each other; that is, a pair of slots 110 and 118 for each of the nipples 104 and a pair of slots 114 and 126 for each of the nipples 112. If the slides in which these slots are formed are shifted in their ways, forces will be applied to each nipple tending to move it in directions at right-angles to each other. These component forces will give a resultant causing the nipple to be shifted in any desired direction and through a distance depending upon the extent of movement of the two slides. By a proper control of the actuating slides, any nipple may be carried to any predetermined point within the range of movement, and thus the nail-delivering elements of the foot-plate F arranged in accordance with any one of a plurality of widely varying inserting designs. I prefer to effect this travel of the slides by a laminate bank of cams rotatable in the casing, there being a cam for individual engagement with each of the contact-surfaces 130 of the slides. Therefore, in the present instance, there are six of these cams which are arranged in two groups, each group comprising three cams disposed side by side as shown in Figs. 6 and 7. Those for the slides 106 and 116 are designated as 140 and 142, respectively. For the slides 120, 120 are cams 144, 144, identical in contour but differing in their angular positions by 180°, and there are similarly formed related cams 146, 146 for the slides 124, 124. Between the cams at the center of the bank is included a worm-wheel 148 through which all the cams are turned as a unit, they being maintained in fixed relation to one another and to the worm-wheel by vertical pins 150 passing through them. The contact-surfaces 130 of five of the slides are held in constant yieldable engagement with the peripheries of the cams by torsion-springs 151, each surrounding a projection 152 from the casing and bearing against the slides or against projections 154 therefrom. The sixth slide 106 is acted upon by a leaf-spring 155 attached to the casing.

Rotatable in bearings 156 upon the rear of the casing 90 is a shaft 158, having fast upon it a worm 160 meshing with the worm-wheel 148. The shaft extends to one side of the frame-column 22, where it is readily accessible to the operator. Here it is furnished with a bearing upon a bracket 161 attached to the column (Fig. 3). Mounted upon the bracket is indicating mechanism I, which may have a rotatable dial 162 bearing graduations and the designations of the various inserting designs in accordance with which the nipples of the foot-plate are to be set. Worm-gearing 163 connects the dial to the shaft 158. The graduations are movable past a fixed index-point 164, as the shaft 158 is turned by a hand-crank 166 upon its outer extremity. The relation between the contours of the cams 140, 142, 144 and 146, the contact-surfaces 130 of the slides 106, 116, 120 and 124 and the graduations of the dial 162, is such that when the crank 166 is turned to bring a particular graduation opposite the index-point 164, the bank of cams will have been carried to a predetermined angular position. The pairs of intersecting nipple-controlling slots in the slides will therefore have carried each of the nipples to its correct position in the chosen design. The effect may be seen by comparing the relation of the elements in Fig. 5, for the formation of the largest inserting design, with that of Fig. 9, for the smallest design.

The novel loading mechanism L, to which the foot-plate mechanism F delivers the nails, may be best seen in Figs. 1, 3, 4 and 12 to 18 of the drawings. The reciprocatory loader-slide 52 has extending outwardly from one side thereof near its forward extremity a bracket 170 (Fig. 15), in which is rotatable a sleeve 172, while rotatable in the sleeve is a short shaft 174. The outer end of the sleeve has an annular flange 176, to the periphery of which is attached a cylindrical casing 178 having a set of openings 180 corresponding to a particular nailing design. These openings are through a plane surface 179 upon the exterior of the casing, to conform more closely to the delivery-ends of the foot-plate nipples, from which the openings receive fastenings, and to the top of the jack 24, to the passages in which they deliver fastenings. The casing may be retained in place separably upon the flange 176 in a definite circumferential relation, by a spring-pressed latch 181 movable in the flange and entering an opening in the casing. Within the casing, fast upon the shaft 174 and just outside the sleeve-flange 176, is an annular flange 182. In this flange is a radial pocket 184, arranged to receive from the nipple 100 of the foot-plate F the rear nail for all designs and to co-operate with one of the casing-openings 180. The shaft has a reduced axial extension 188, about which is a cylinder 190 held in place by a thumb-nut 192 threaded upon the end of the extension. The angular position of the cylinder about the shaft-extension is determined by an interengaging radial tongue-and-groove connection at 194. The cylinder is provided with a set of pockets 196 corresponding to and co-operating with the casing-openings 180, these, with the flange-pocket 184, completing the nail-carrying means for the loading device l. Relative rotation between the flange 182 and cylinder 190 and the casing 178 about a common axis may cause the registration or non-registration of the pockets and openings, and therefore the discharge or retention of the nails. Upon removing the retaining nut 192, the cylinder 190 may be separated from the shaft-extension and the casing 178 withdrawn from the latch 181, and elements having holding means arranged for other nailing designs substituted. Or the cylinder and casing may be provided with a plurality of corresponding sets of pockets and openings for different designs, these being made selectively effective by having a plurality of differently disposed openings for the latch 181 and similarly arranged grooves for the connection 194.

Figures 14, 15, 16, 17, 18:
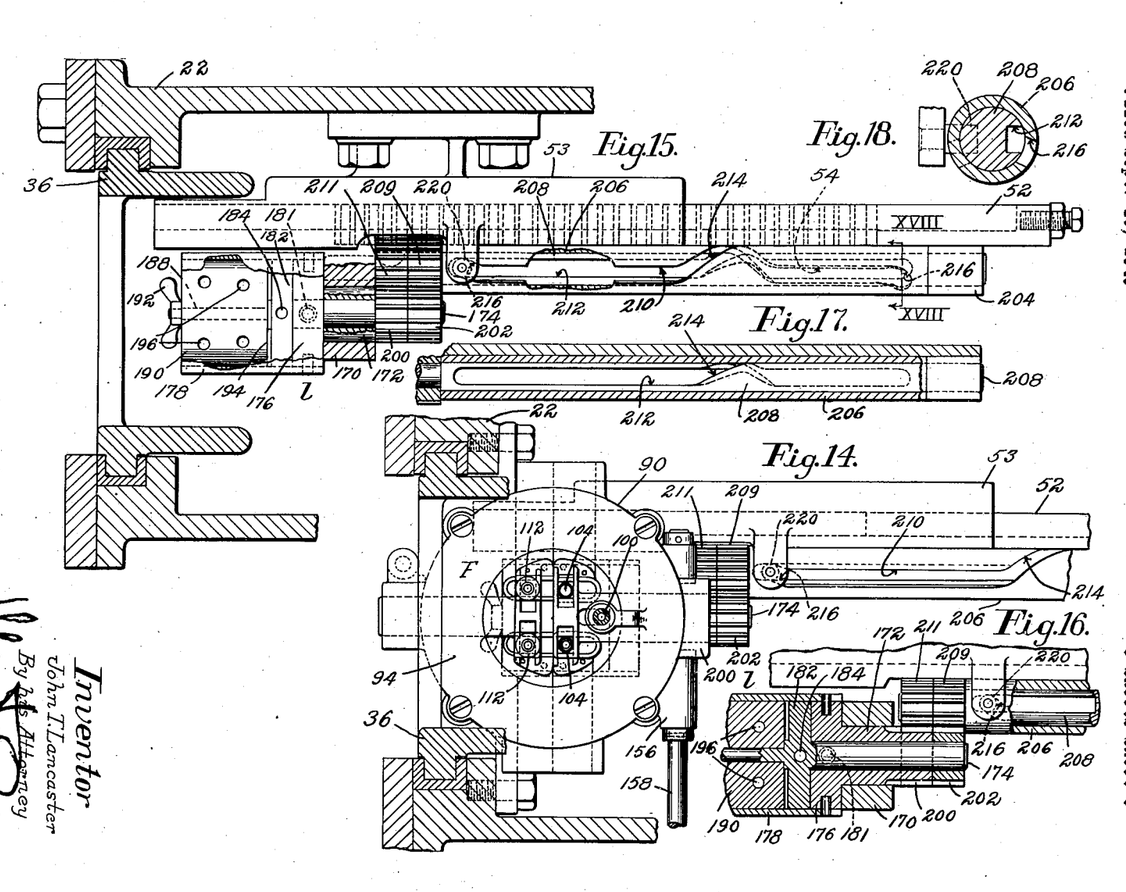
Fig. 14, a top plan view of the foot-plate mechanism and loading mechanism.
Fig. 15, a like view of the loading mechanism only, with the casing of the loading device broken away.
Fig. 16, a fragmentary horizontal section through the loading mechanism.
Fig. 17, a top plan view of the loader-shaft, with the surrounding sleeve in section.
Fig. 18, a transverse sectional detail on the line XVIII—XVIII of Fig. 15.

Nails or other fastenings are supplied by the tubes 50 from the distributor D, points down, and must be delivered to the jack 25, points up, for insertion in the work. This inversion, I accomplish by rotation of both flange 176 with the casing 178 and the flange 182 and cylinder 190. The sleeve 172 and shaft 174, respectively carry a pinion 200 and a pinion 202. The slide 52 has projecting from one side near its rear extremity a bracket 204 (Fig. 15), and in this bracket and in the bracket 170 a sleeve 206 is rotatable. A shaft 208 is arranged to turn within the sleeve 206. Rotation of the sleeve 206 is communicated to the shaft 174 through a pinion 209 meshing with the pinion 202, while a pinion 211 transmits the rotation of the shaft 208 to the sleeve 172 through the pinion 200. Extending longitudinally of the sleeve 206 is a slot 210 of a length substantially equal to the extent of travel of the loading device l. In the shaft 208 is a groove 212 of like length (Fig. 17). At or near the center of both the slot and groove is a curved cam-portion 214, extending through about 180° of the circumference of each and being of the same form in both. Except for the cam-portion 214, the shaft-groove is straight throughout its length, although in two sections at opposite sides of said cam-portion. The form of the sleeve-slot coincides with that of the shaft-groove, except that at the ends of the former there are oppositely inclined offsets 216, 216. Rotatable on the bracket 53 is a roll 220 lying in both the slot and groove. As said slot and groove travel along the roll in the reciprocation of the loader-slide 52, the relation between the nail-holding pockets of the flange 182 and cylinder 190 and the nail-discharging openings of the casing 178 is such, that when the straight portions engage the roll an angular relation is established in which the pockets are closed by the imperforate portion of the casing-wall. This relation is maintained during the passage of the cam-portions 214 along the roll, although the cylinder and casing will be inverted together by the cam-portions 214. When, however, either offset 216 co-operates with the roll, the sleeve 206 only is turned. This brings the pockets of the flange 182 and cylinder 190 into registration with the casing-openings through rotation of the pinion 209, pinion 202 and shaft 174.

There results the following action during each nail-transferring cycle. When the loading device *l* is beneath the foot-plate F, the forward offset 216 of the sleeve-slot 210 engaging the roll 220 shifts the sleeve 206 and therefore the flange 182 and cylinder 190, to open the pockets 184 and 196. The openings in the casing 178 are at this time uppermost, as appears in Fig. 12, held beneath the nipples of the foot-plate ready for the reception of the load of nails, supplied points down. When the advance of the loading device is produced as a result of the actuation of the lever 74, as soon as the sleeve-offset leaves the roll, the straight portion of the sleeve-slot coming into registration with that of the groove causes the pockets to leave the casing-openings so they are closed. As the loading device continues its travel toward the jack 24, the cam-portions 214 of the slot and groove reach the roll and impart to the entire loading device a half turn, the still closed pockets now being directed downwardly with the nails retained points up. When the loading device reaches and passes above the jack, the rear offset 216 of the sleeve is acted upon by the roll and shifts the pockets sufficiently to again bring them into registration with the casing-openings. These are now above the jack-passages (Fig. 13), so the nails fall heads down upon the drivers 26. During the return of the loading device to the foot-plate, the movements of the casing 178, flange 182 and cylinder 190 occur in the reverse order.

Figure 2:
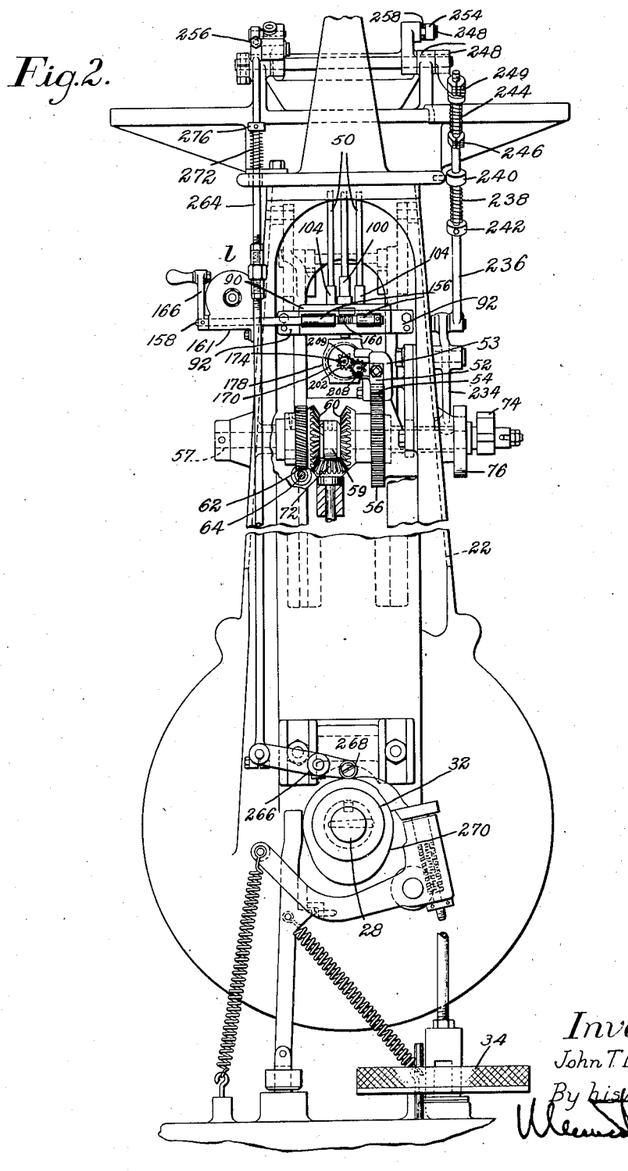
Fig. 2 is a partial rear elevation of the machine.

The delivery of nails from the distributor D to the loading device *l* through the foot-plate F is governed in such a manner that no nail-retaining shutter is required at the foot-plate, and delivery cannot be made until the loading device has dropped its nails into the jack 24 and said nails have been driven from the jack, so all the elements are ready for the supply of another load. The distributor is shown as having conventional slotted raceways 226 (Figs. 1 and 19) down which series of nails flow, hanging by their heads. At the ends of the raceways the nails are picked off, load by load, by a delivery device in the form of a reciprocatory slotted picker-plate 228, the carrier 229 of which is moved to the right idly under the power of the machine and then in the opposite direction under the influence of an expansion spring 230, for the plate to separate the nails and hold them to be dropped into the tubes 50. This nail-discharging movement of the plate is under the control of the peripheral portion of the cam 76 (Figs. 1 to 4), which is rotated by the shaft 57 during each nail-delivering movement of the loading mechanism. With this cam-portion contacts a roll 232 upon one arm of a bell-crank-lever 234 fulcrumed outside the column. To a second arm of the lever is joined a link 236, surrounding which is an expansion-spring 238 interposed between a projection 240 from the column and a collar 242 fast on the link. The spring urges the link down and the roll into constant engagement with the cam. About the upper end of the link is a compression-spring 244, supported between a collar 246 secured to the link and one arm of a bell-crank-lever 248 fulcrumed upon the end of the distributor below the carrier 229, through which arm said link passes loosely. A collar 249 secured to the link above the lever-arm determines the angular position of the lever. A second arm of the lever 248 has pivoted to it an upwardly extending link 250, through a slot in which passes a pin 252 fixed in the side of a hook 254 pivoted upon an upwardly extending arm of a bell-crank-lever 256 fulcrumed with the lever 248. A torsion-spring 258 surrounding the pivot of the hook holds said hook normally raised, with the pin 252 in engagement with the top of the slot. But when the cam 76 acting through the lever 248 and link 250 depresses the hook, it contacts with an upper inclined surface 259 of a projection 260 from the picker-plate-carrier, and forces this to the right against the force of the spring 230. The point of the hook is then latched in engagement with the projection by extending beneath an overhang 262 of said projection. A second arm of the lever 256 is connected by a link 264 to one arm of a lever 266 fulcrumed in the rear of the lower part of the frame-column and provided with a roll 268 (Fig. 2). This roll rests against the periphery of a second delivery-controlling cam 270 fast on the shaft 28, rotated through the clutch 32 to actuate the drivers 26. Engagement of the roll with the cam is yieldably maintained by an expansion-spring 272 interposed between the frame 22 and an adjustable collar 276 upon the link 264.

Initially, the loading device *l* contains a load of nails supplied during the preceding operating cycle. The hook 254 at the distributor is raised by its spring 258 with its point above the surface 259 upon the projection 260, as appears in Figs. 1 and 19. The operator actuates the lever 74, causing the loading device to advance and deliver its load of nails to the jack 24 and return to its position beneath the foot-plate F. As the cam 76 rotates, it acts upon the lever 234 and through the link 236, lever 248 and link 250 draws down the hook. The engagement of the point of the hook with the incline 259 of the picker-projection forces the picker-plate 228 to the right against the force of the spring 230. As the point of the hook passes below the end of the incline, the spring returns the picker-plate to the left, latching the hook beneath the overhang 262. Thus, the picker mechanism of the distributor has been prepared for the supply of a load of nails to the device *l*, the rotation of the cam 76 during the reciprocation of the loading mechanism L showing that said device has made its delivery to the jack and is therefore empty and in position to receive another load. The operator now jacks a shoe, applies a heel to the heel-seat and depresses the treadle 34. This first brings down the head 36 to apply pressure to the work, and then trips the clutch 32 to turn the shaft 28 through a single rotation. The drivers 26 are thus reciprocated, to insert the nails which the device *l* has just delivered to them, to attach the heel to the shoe. The previously contained nails having been driven from the jack, it is ready for the reception of another load. With the shaft 28, the cam 270 rotates through 360°. By its effect on the lever 266, it actuates the link 264 and the lever 256 to draw the hook 254, with the picker-plate 228, to the right. The cam 270 now permits the actuating elements to move reversely, so the spring 230 carries the picker-plate to the left, separating a load of nails from the raceways and dropping them through the tubes 50 and the nipples of the foot-plate mechanism directly into the pockets of the waiting loading device. Control of the entrance of the nails into the loading device is wholly by the properly timed operation of the picker-plate, no foot-plate-shutter being necessary. The contour of the cam 270 allows the hook 254 to travel farther to the left than does the picker-plate, and then returns it to its initial position above the surface 259 of the projection 260. The hook has thus been released from the projection to be raised by the spring 258, and all the elements are ready for the supply of another load from the distributor, when the actuation of the lever 74 by the operator disposes of the nails which the loading device contains.

Having described my invention, what I claim as new and desire to secure by Letters Patent of the United States is:

1. In a fastening-inserting machine, a support, a plurality of controlling members, each of said members being mounted for movement on the support, a fastening-receiving member engaged by the controlling members, said controlling members, being constructed and arranged to impart to said fastening-receiving member a movement which is the resultant of their individual movements, and means for operating each of said controlling members.

2. In a fastening-inserting machine, a support, a plurality of controlling members, each of said members being mounted for movement on the support, a fastening-receiving member engaged by the controlling members, connections between said fastening-receiving member and each of said controlling members constructed and arranged to impart a movement to the fastening-receiving members corresponding to that of each of said controlling members, and means for operating said controlling members.

3. In a fastening-inserting machine, a support, a plurality of controlling members, each of said members being movable on the support and being provided with a surface arranged to extend transversely of the direction of its movement, a fastening-receiving tube engaged by said surfaces, and means for moving said controlling members.

4. In a fastening-inserting machine, a support, a fastening-receiving member, and controlling members for positioning said fastening-receiving member, each controlling member being mounted on said support for movement transversely of the other and having a surface adapted to be engaged by said fastening-receiving member, said surface on each controlling member being arranged to extend in the direction of movement of the other controlling member.

5. In a fastening-inserting machine, a support, a plurality of controlling members each of which is movable on the support, each member having a slot extending transversely of the direction of movement of the member, a fastening-receiving tube received in the slots of said controlling members, and a cam individual to each controlling member and being movable on the support to actuate said controlling member.

6. In a fastening-inserting machine, a support, a pair of controlling members, each of which is movable transversely of the other on the support, a fastening-receiving tube, connections between said tube and said controlling members constructed and arranged to impart to said tube the movement of each of said controlling members, a cam for operating each controlling member and being mounted for movement on said support, and means for operating said cams simultaneously.

7. In a fastening-inserting machine, a casing, slides movable in the casing and having intersecting slots, each slot being arranged to extend transversely of the direction of movement of the slide in which it is formed, fastening-receiving tubes carried by the slides and extending through the slots for actuation by said slides, and slide-moving cams rotatable in the casing.

8. In a fastening-inserting machine, a casing in which a fastening-receiving tube is fixed, slides movable in the casing toward and away from said fixed tube, each slide having slots in which a pair of adjustable fastening-receiving tubes are mounted for movement transversely of the slide, a slide individual to each of said adjustable tubes and mounted for movement crosswise of the first-mentioned slides, and means for operating said slides to position said fastening-receiving tubes in accordance with a desired heel-nailing design.

9. In a fastening-inserting machine, a casing, slides movable in the casing and having intersecting slots arranged to extend transversely of the direction in which the slides move, fastening-receiving tubes carried by the slides and extending through the slots, a laminate bank of cams rotatable in the casing and including one for contact with each slide, and means for rotating the bank as a unit.

10. In a fastening-inserting machine, a casing, slides movable in the casing and having intersecting slots arranged to extend transversely of the direction in which the slides move, fastening-receiving tubes carried by the slides and extending through the slots, a laminate bank of cams rotatable in the casing and including one for contact with each slide, means for rotating the bank as a unit, and indicating means rotatable with the bank and graduated in accordance with the positions which the tubes are to assume.

11. In a fastening-inserting machine, a casing, slides movable in the casing and having intersecting slots arranged to extend transversely of the direction in which the slides move, fastening-receiving tubes carried by the slides and extending through the slots, a laminate bank of cams rotatable in the casing and including one for contact with each slide, a gear forming a part of the bank, and means meshing with the gear for effecting the rotation of the bank.

12. In a fastening-inserting machine, a casing, a slide movable in the casing and having a plurality of slots, a fastening-receiving tube carried in and being movable along each slot, a slide individual to each tube and movable in the casing and having a slot intersecting the corresponding slot of the first-mentioned slide and through which said tube passes, and means for reciprocating the slides.

13. In a fastening-inserting machine, a casing, a slide movable in the casing and having a plurality of slots, a fastening-receiving tube carried in and being movable along each slot, a slide individual to each tube and movable in the casing and having a slot intersecting the corresponding slot of the first-mentioned slide and through which said tube passes, a bank of cams rotatable in the casing there being a cam individual to each slide, means by which the slides are held in contact with the cams, and means arranged to rotate the bank of cams.

14. In a heel-attaching machine, a nail-distributor, flexible tubes to which the distributor supplies nails, a foot-plate mechanism including a casing, nipples situated in the casing and in which the tubes terminate, cams assembled in the casing in a rotatable bank and surrounding the nipples, slides movable in the casing and having intersecting slots the walls of which engage the nipples, said slides having surfaces for engagement with the peripheries of the cams, and means arranged to rotate the bank of cams.

15. In a heel-attaching machine, a nail-distributor, flexible tubes to which the distributor supplies nails, a foot-plate mechanism including a casing, nipples situated in the casing and in which the tubes terminate, cams assembled in the casing in a rotatable bank and surrounding the nipples, slides movable in the casing and having intersecting slots the walls of which engage the nipples, said slides having surfaces for engagement with the peripheries of the cams, the relation between the contour of the cams and their engagement with the slides being such that different angles of rotation of the bank carry the nipples to positions corresponding to different heel-nailing designs, and means arranged to rotate the bank of cams.

16. In a heel-attaching machine, a nail-distributor, flexible tubes to which the distributor supplies nails, foot-plate mechanism including a casing, nipples situated in the casing and in which the tubes terminate, cams assembled in the casing in a rotatable bank and surrounding the nipples, slides movable in the casing and having intersecting slots the walls of which engage the nipples, said slides having surfaces for engagement with the peripheries of the cams, the relation between the contour of the cams and their engagement with the slides being such that different angles of rotation of the bank carry the nipples to positions corresponding to different heel-nailing designs, and means arranged to rotate the bank and including indicating means graduated in accordance with the designations for heel-nailing designs.

17. In a heel-attaching machine, a nail-distributor, flexible tubes to which the distributor supplies nails, a foot-plate mechanism including a casing, nipples situated in the casing and in which the tubes terminate, cams assembled in the casing in a rotatable bank and surrounding the nipples, slides movable in the casing and having intersecting slots the walls of which engage the nipples, said slides having surfaces for engagement with the peripheries of the cams, the relation between the contour of the cams and their engagement with the slides being such that different angles of rotation of the bank carry the nipples to positions corresponding to different heel-nailing designs, gearing including an element assembled in the bank, a shaft by which the gearing is turned, and a dial rotated by the shaft and graduated in accordance with the designations for heel-nailing designs.

18. In a heel-attaching machine, a nail-distributor, flexible tubes to which the distributor supplies nails, a foot-plate mechanism including a casing, nipples situated in the casing and in which the tubes terminate, cams assembled in the casing in a rotatable bank and surrounding the nipples, slides movable in the casing and having intersecting slots the walls of which engage the nipples, said slides having surfaces for engagement with the peripheries of the cams, the relation between the contour of the cams and their engagement with the slides being such that different angles of rotation of the bank carry the nipples to positions corresponding to those for the breast-nails and intermediate nails of different heel-nailing designs, a nipple fixed in position upon the casing and corresponding to the rear nail of all designs, this rear nipple extending through one of the slides, and means arranged to rotate the bank of cams.

JOHN T. LANCASTER.

REFERENCES CITED

The following references are of record in the file of this patent:

UNITED STATES PATENTS

| Number | Name | Date |
| --- | --- | --- |
| 1,545,570 | Pope | July 14, 1925 |
| 1,661,302 | Pope | Mar. 6, 1928 |
| 1,975,468 | MacDonald | Oct. 2, 1934 |
| 2,112,885 | Gour | Apr. 5, 1938 |
| 2,346,262 | Lancaster | Apr. 11, 1944 |